United States Patent [19]
Minks

[11] 3,750,637
[45] Aug. 7, 1973

[54] ALTERNATOR-RECTIFIER ELECTRONIC CHARGING AND DISCHARGING APPARATUS FOR IGNITION SYSTEMS AND THE LIKE

[76] Inventor: Floyd M. Minks, Rt. 1 Box 66, Kissimmee, Fla. 32741

[22] Filed: Sept. 7, 1971

[21] Appl. No.: 178,323

[52] U.S. Cl. ............... 123/148 E, 315/209 CD
[51] Int. Cl. ............................................. F02p 3/06
[58] Field of Search ............................. 123/148 E

[56] References Cited
UNITED STATES PATENTS

| | | |
|---|---|---|
| 3,240,198 | 3/1966 | Loudon et al. ............... 123/148 E |
| 3,646,605 | 2/1972 | Plume ............................. 123/148 E |
| 3,566,188 | 2/1971 | Minks ............................. 123/148 E |

OTHER PUBLICATIONS

"Breakerless High-Frequency Ignition System" S.A.E. Journal, July, 1963.

*Primary Examiner*—Laurence M. Goodridge
*Assistant Examiner*—Cort Flint
*Attorney*—David Rines and Robert H. Rines

[57] ABSTRACT

This disclosure deals with a novel impulse producing apparatus for ignition systems and the like involving a full-wave rectifier charging circuit discharged by solid-state switching means and controlled by a half-wave rectifying circuit that prevents failure to turn off the switching means.

13 Claims, 1 Drawing Figure

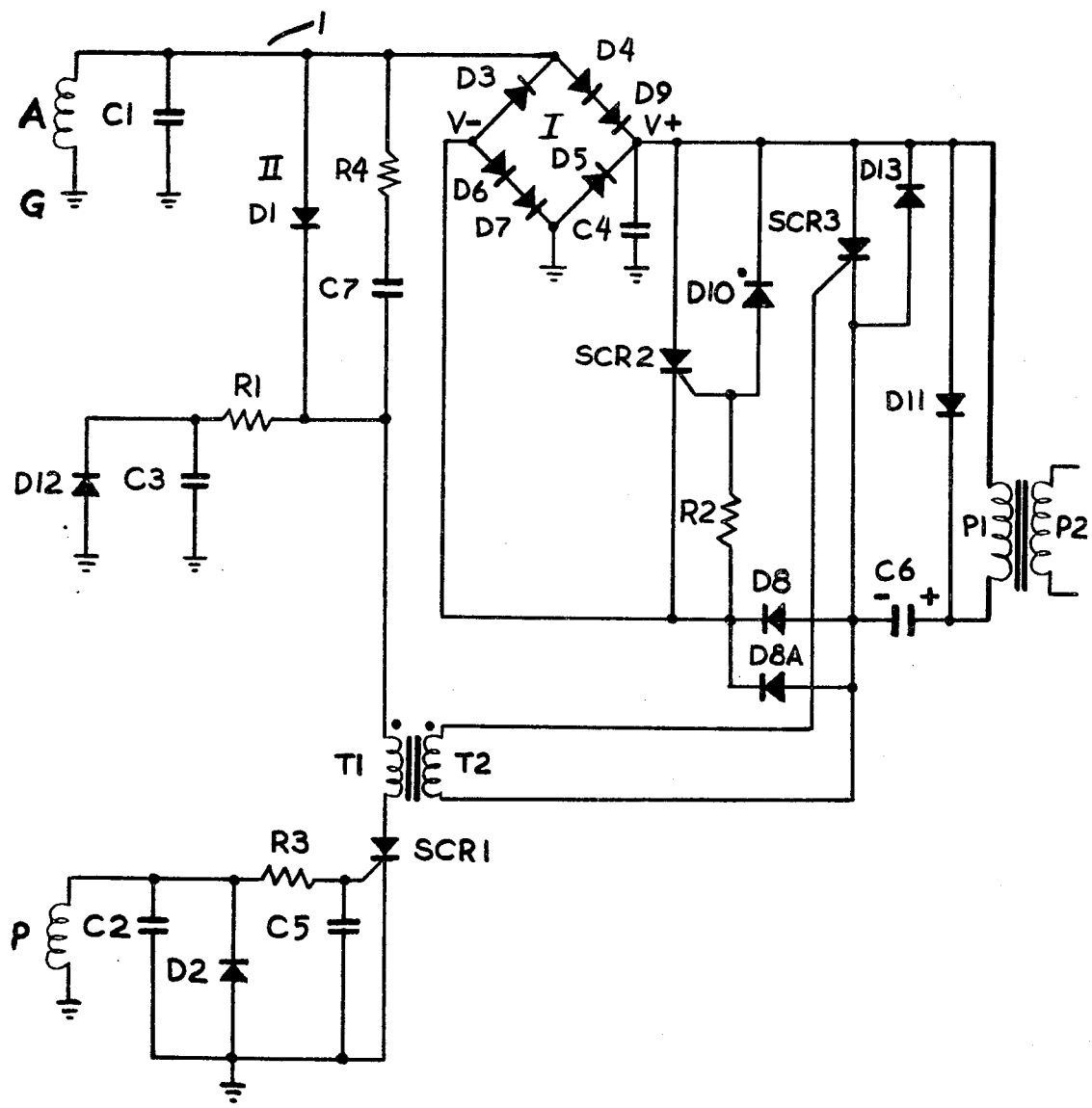

ALTERNATOR-RECTIFIER ELECTRONIC CHARGING AND DISCHARGING APPARATUS FOR IGNITION SYSTEMS AND THE LIKE

The present invention relates to capacitor charging and discharging apparatus for generating impulses to be used in ignition and similar systems, being more specifically directed to vehicular systems and the like embodying alternators for generating alternating current energy during the operation of an engine, the speed of which may vary from start up to relatively high speeds.

Through the years, the problem of electronically producing ignition pulses for engines and the like from alternating-current voltages generated by engine alternator apparatus has been approached with a myriad of different types of alternator and rectifier combinations. In my prior U.S. Letters Patent No. 3,566,188, issued Feb. 23, 1971, for Triggered Ignition Systems, for example, the use of series-connected half-wave rectifiers is disclosed for enabling charging of the storage capacitor from the alternator-produced voltage. With a simple series-connected half-wave rectifier, if the alternator winding is constructed to provide optimal output at higher speeds, relatively low output will result at the lower engine speeds in view of the substantially linear decrease of output with decreasing engine speeds. If, on the other hand, the alternator winding is provided with a large number of turns for optimal low speed output, very reduced output occurs at the higher speeds and, indeed, deleterious inverse voltages are applied to the rectifier. In such operation, resort may be had to holding off such inverse voltages by shunting the alternator winding with a further diode; but such hold-off circuits introduce phase shifts that reduce output at the higher speeds. The art has accordingly had to put up with serious compromises in using these half-wave rectifier circuits; though they have been widely used in commerce despite their inherent disadvantages.

It has seemed of interest to try to obtain greater output through the use of a full-wave rectifier circuit in these alternator applications. Unfortunately, however, attempts to do this with SCR and similar solid-state switching devices for discharging the storage capacitor have resulted in serious problems at the higher speeds and, more particularly, at elevated temperatures, wherein insufficient time frequently is provided for insuring the turn-off of the SCR, such that the system frequently loses ignition under such conditions of operation. This lack of reliability with full-wave rectifier systems and such switching devices has heretofore been considered inherent in the nature of the systems, so that this approach has not heretofore appeared practically realisable.

Instead, improvement in these problems has been approached by attempts to employ a plurality of alternator windings, one suitable for the low frequencies generated by the low engine speeds, and the other for the higher frequencies, as described, for example, in my said patent. While this approach has improved the operation, it is subject to the disadvantages of its inherent complexity, particularly since it involves the use of two different alternator windings which must be isolated both electrically and magnetically and it gives rise to voltages in the order of 1000 volts that appear on alternator leads connected to the system as a result of inverse voltages produced at the series rectifier diode.

In accordance with discoveries underlying the present invention, it has been found possible to provide a most satisfactory solution to the above described problems through the use, in summary, of a full-wave rectifier system for charging the storage capacitor from the alternator and the use of a half-wave rectifier circuit, preferably, though not essentially, to control the firing of the switching device in the full-wave rectifier charging circuit in order to discharge the same, but more importantly, positively enabling the turn-off of the switching device initiating the discharge of the storage capacitor irrespective of the high speeds of operation of the engine and the resulting high frequencies generated by the alternator and the high temperatures to which the switching devices may be subjected.

An object of the invention, accordingly, is to provide a new and improved ignition apparatus involving alternator-rectifier charging and discharging circuits and void of the disadvantages above-described.

A further object is to provide a novel ignition apparatus readily adaptable to present magneto-magnetic circuits which have space only for a single alternator winding, and to give from these a high output reliable ignition system which operates over a greater speed range than previously available.

Still a further object is to provide a novel capacitor charging and discharging circuit of more general applicability, as well.

Still an additional object is to provide a novel voltage-actuated solid-state regulating system adapted to insure only the adequate charge of the storage capacitor, even with alternators with high output energy or power capabilities, and without the requirement of the ignition system package or components dissipating these high powers.

Other and further objects will appear hereinafter and are more particularly delineated in the appended claims. The invention will now be described with reference to the accompanying drawing, the single FIGURE of which is a schematic circuit diagram illustrating the invention in preferred form and as applied to a specific ignition apparatus application.

Referring to the drawing, a vehicular alternator or the like is schematically illustrated at A, generating alternating-current energy which is shown applied by way of conductor 1 to the upper vertex terminal of a full-wave rectifier bridge I, and by way of the ground terminal G to the lower vertex or ground terminal of the rectifier bridge I. This advantageously provides for only one exposed alternator voltage terminal with its maximum voltage typically under 200 volts. The opposed pairs of arms of the bridge are respectively shown comprising single diodes D3 and D5, and pairs of diodes D4 – D9 and D6 – D7 for a reason later explained. The horizontal vertices of the full-wave rectifier bridge I at V– and V+ are shown connected in a charging circuit comprising isolation diodes D8 and D8A in parallel, the energy storage capacitor C6, and either the primary P1 of the spark transformer or the diode D11. The discharge of the energy stored in capacitor C6 is effected under the control of a first switching device shown in the preferred form of the SCR element labelled SCR3. The switching device SCR3 is shown connected through D8 across the bridge rectifier terminals V+ and V–, and with an oppositely poled rectifier D13 being connected there-across, if desired, to minimize any impulses that might arise from the inductance in the leads associated with the switching device SCR3 and the elements D11 and C6, and might otherwise feed back into the bridge rectifier I.

As before indicated, one of the drawbacks in attempting to use SCR solid-state switching devices and similar elements for controlling the discharge of storage capacitors in full-wave rectifying systems associated with alternator sources of energy and the like, has resided in the fact that often the SCR device is not reliably turned off. If the frequency of the supply increases, the time that a full-wave rectified current drops below the holding current of the SCR decreases; and thus, for frequencies above 60 cycles, particularly at high temperatures, the SCR may not turn off. In accordance with the present invention, it has been discovered how positively to insure such turn-off and thus reliably to use full-wave rectifiers in circuits of this character, with the resulting increase in available energy.

In the preferred form, this is effected under the control of a trigger impulse generated in a half-wave rectifying path generally designated at II, connected across the alternator source of alternating-current voltage A in parallel with the bridge I.

The half-wave rectifying path II comprises a diode rectifier D1, a primary winding T1 of a trigger transformer, and a further switching device SCR1. In this embodiment, the half-wave rectifier D1, during appropriate half-cycles of the alternating-current voltage supplied from the alternator A, charges a further capacitor C3 through R1. A diode D12 is shown connected across the capacitor C3 so that, in conjunction with C7 and R4 (shunting diode D1), the charging of capacitor C3 is assured even if the alternator input voltage does not go positive with respect to ground, which may happen with certain characteristics of the alternator and other circuit components.

In the engine ignition systems, the capacitor C3 is periodically discharged through the trigger transformer primary T1 in response to successive timing or trigger impulses, illustrated as applied from pick-up coil P to the trigger electrode of the switching device SCR1. The input circuit for this triggering comprises a series resistor R3 and a shunt diode D2, with input and output shunt by-pass capacitors C2 and C5, serving to prevent the false triggering of SCR1 or overload of the same. In operation, the advent of the low amplitude timing impulse at P causes SCR1 to conduct and enables the discharge of the energy stored to capacitor C3 through the trigger transformer primary winding T1, generating a trigger impulse in the secondary winding T2 thereof that is applied to the trigger gate of SCR3, amplified as a rapidly rising relatively high amplitude pulse. This renders SCR3 effective (conductive), thereupon to discharge the storage capacitor C6 and thereby generating the ignition impulse in the primary winding P1 of the output ignition transformer output load, such that, in the stepped-up secondary winding P2 thereof, the required ignition-producing pulse is generated.

In order to solve the problem of insuring turn-off of the switched SCR3 in this full-wave rectifying charging and discharging system, it is important to design the voltage drop across the half-wave rectifying path II, when conductive, to be less than that across the bridge rectifier I with SCR3 connected between its vertices V+, V−. This is shown effected by the use of the additional diodes D7 and D9 in the before-mentioned arms of the rectifier bridge I. Through this design, the alternator A, on the appropriate portion of the positive half-cycle of its generated voltage, becomes effectively shunted by the lower voltage drop path II, such that the alternating-current energy from the alternator A becomes thus diverted from the full-wave bridge rectifier I and the output components connected thereto, thus insuring positive turn-off of SCR3, irrespective of how high in frequency the alternator energy may rise with engine speed.

In effect, therefore, SCR1 in this preferred circuit acts not only as the device for rendering the half-wave rectifying path II conductive in order to divert energy from the full-wave rectifier I and thus insure positive turn off of SCR3, but also serves as a trigger amplifier applying a periodic rising high amplitude pulse to trigger the gate of SCR3. The type of solid-state switch SCR1 is a lower-current SCR than SCR3 and operates on a relatively low amplitude pulse which does not need a rapid rise time; such that, unlike SCR3, SCR1 is readily triggerable over a wide temperature range directly from small pick-up coils which cannot easily drive high current SCRs, such as SCR3.

A further refinement that also has more general application in other types of alternator charging and discharging circuits of this character, but that is particularly useful in the combination of the present invention, resides in the use of a voltage-actuated, preferably solid-state further regulating switching means for preventing excessive charging of capacitor C6 once it has attained the desired predetermined adequate charge from the full-wave rectifier I. The regulating switching network employed is equivalent to a modified Shockey diode circuit and is illustrated as embodying SCR2 provided with a zener diode D10 connected from its trigger gate to the terminal V+, and with resistor R2 connected from the trigger gate to terminal V−. Upon the charging of the storage capacitor C6 to the predetermined adequate charge, this voltage-actuated switching circuit is rendered conductive and effectively short-circuits the input from the alternator A, preventing further current from flowing to the storage capacitor C6; but, in view of the presence of the isolating diodes D8 and D8A, this is done while preventing the conducting of the voltage-acutated regulating network SCR2-D10 from discharging the charged storage capacitor C6. When this important refinement is used in the circuit of the present invention, the conduction at the appropriate portion of the positive cycle through the half-wave rectifier path II will insure not only the positive turn off of the SCR3, but of the voltage regulating switching member SCR2, as well. Through the use of the combination of SCR2 and the zener diode D10, or other Schockley type diode or similar arrangement, the problems of highly rated zener diodes and the heat sink cooling associated therewith, present in other types of regulating circuits principally using the regulating action of the zener diode itself, are obviated. This type of regulation in alternator rectifier charging and discharging circuits is also of utility with other alternator and rectifier configurations, with the regulation being effectable on the AC as well as the DC side of the rectifier, provided diode isolation is provided to prevent the switching of the regulator network from simultaneously discharging the storage capacitor while it effectively short circuits the energy from the alternator A.

While the invention has been described in connection with its preferred form in accordance with which the triggering of SCR3 is effected from the triggering of SCR1, it is to be understood that these triggering roles could be reversed, and that other triggering sources could also be employed, as is well known in the art.

A successful circuit of the type described was tested with SCR1 and SCR2 being 2N3004 type SCR devices, and SCR3 being of the type 36870. Diodes D2, D3, D5, D6, D7, D8, D8A, D9 and D12 were of the 1N661 type; D1 was of the 1N647 type; D13 of the G.E. A14 type; D11 of the type 1N3492; and the zener diode D10 of type Central Lab HM173B. By-pass capacitors C1 across the alternator A and C4 across the bridge diode D5 were of value 2200 pF, and C2 and C5 of value 0.01 $\mu$F. Capacitors C3 and C6 were respectively 0.047 and 4 $\mu$F, and capacitor C7, 0.0056 $\mu$F. Resistors R2 and R3 each had a value of 330 ohms, and resistors R1 and R4, 47 and 4700 ohms, respectively.

Using as the alternator A a 3000-turn winding on an armature of a 4-pole Bausch alternator of the type commonly used on snow vehicles, firing twice per revolution, 173 volts developed on the energy storage capacitor C6 from 200 to 7000 RPM, with approximately half that voltage at 100 and 14,000 RPM. This regulation range is approximately 2-1 better than what has previously been obtained even with separate windings on much larger alternators, such as the 12-pole types commonly used on large outboard motors. Such systems of the invention, moreover, were operated for the equivalent of 3000 hours and tested at both minus 65 and plus 125° C, with no instance of SCR lock-up or any other malfunction or component failure.

Where circuits refinements are not required, components such as C1 and D4, R4-C7, R1-D12, the input network to SCR1, D8A and D13 and, if the voltage drop across path II is sufficiently low, D7 and D9, may be omitted without interfering with the basic operation of the system. If C3 and R1 are omitted, the alternator A may supply the trigger energy.

This circuit does not require that the alternator frequency be identical to the firing frequency of the ignition system. Since the alternator wave form does not determine timing, its phase relationship with the pick up generally need not accurately be known. This is of particular advantage if other coils, such as might be used for battery charging, are one the same alternator, thus changing the output voltage phase relationship in an unpredictable manner. In such cases, however, where these are not prohibitive limitations, a characteristic of a portion of the alternator waveform could be used to supply the input signal normally derived from a separate pick up. thus eliminating the need for such pick up as well.

Further modifications will occur to those skilled in this art and all such are considered to fall within the spirit and scope of the invention as defined in the appended claims.

What is claimed is:

1. In an ignition apparatus and the like, alternator means for generating alternating-current energy, storage capacitor means having charging and discharging circuits, the charging circuit comprising full-wave rectifier means connected to receive alternating-current energy from the alternator means in order to charge the storage capacitor means, the discharging circuit comprising an output load and a first switching means adapted, when triggered, to discharge the energy stored in the storage capacitor means into the output load, the first switching means being susceptible to inability to turn off between successive full-wave rectified half-cycles of particular frequencies of the alternating-current energy, a half-wave rectifying path comprising further switching means connected with said alternator means and of lesser voltage drop there-across than that across the combination of the full-wave rectifier means with the first switching means, and means for periodically triggering the further switching means correspondingly periodically to divert the alternating-current energy of the alternator means from the full-wave rectifier means in view of said lesser voltage drop in order to insure turn-off of said first switching means.

2. Apparatus as claimed in claim 1 and in which said path comprises further capacitor means chargeable during said half-wave rectifying from the alternator means, and in which there is provided means responsive to the triggering of the further switching means for discharging the energy of the further capacitor means and for applying an amplified pulse therefrom to trigger the first switching means.

3. Apparatus as claimed in claim 2 and in which said switching means comprise solid-state SCR-type devices and said output load comprises ignition transformer means.

4. Apparatus as claimed in claim 3 and in which the periodic triggering means comprises timing impulse means for controlling the ignition.

5. Apparatus as claimed in claim 4 and in which said further switching means is connected with a trigger transformer winding across said further capacitor means, and in which the applying means comprises means cooperative with the trigger transformer winding and connected with the first switching means.

6. Apparatus as claimed in claim 1 and in which voltage actuated solid-state switching means is connected effectively to short-circuit the alternator means when the storage capacitor means reaches a predetermined adequate charge, but with diode isolation means being connected to prevent the simultaneous discharging of the storage capacitor means by the voltage-actuated solid-state switching means.

7. Apparatus as claimed in claim 1 and in which voltage-actuated solid-state switching means is connected through diode isolation means across said storage capacitor means to regulate the rectified alternator energy by effectively short-circuiting the alternator means when the storage capacitor means reaches a predetermined adequate charge.

8. In an ignition apparatus and the like, alternator means for generating alternating-current energy, storage capacitor means having charging and discharging circuits, the charging circuit comprising rectifier means connected to receive alternating-current energy from the alternator means in order to charge the storage capacitor means, the discharging circuit comprising an output load and a switching device adapted, when triggered, to discharge the energy stored in the storage capacitor means into the output load, and voltage-actuated solid-state switching means connected effectively to short-circuit the alternator means when the storage capacitor means reaches a predetermined adequate charge, but with diode isolation means being connected to prevent the simultaneous discharging of the storage capacitor means by the voltage-actuated solid-state switching means.

9. In an ignition apparatus and the like, alternator means for generating alternating-current energy, storage capacitor means having charging and discharging circuits, the charging circuit comprising rectifier means connected to receive alternating-current energy from the alternator means in order to charge the storage capacitor means, the discharging circuit comprising an output load and a switching device adapted, when triggered, to discharge the energy stored in the storage capacitor means into the output load and voltage-actuated solid-state switching means connected through diode isolation means across the storage capacitor means to regulate the rectified alternator energy by effectively short-circuiting the alternator means when the storage capacitor means reaches a predetermined charge.

10. Apparatus as claimed in claim 1 and in which one terminal of the alternator means is grounded.

11. Apparatus as claimed in claim 8 and in which one terminal of the alternator means is grounded.

12. In an engine ignition apparatus and the like, alternator means for generating alternating-current energy, storage capacitor means having charging and discharging circuits, the charging circuit comprising full-wave rectifier means connected to receive alternating-current energy from the alternator means in order to charge the storage capacitor means, the discharging circuit comprising an output load and a first switching means adapted, when triggered, to discharge the energy stored in the storage capacitor means into the output load, a half-wave rectifying path comprising further switching means connected with said alternator means independently of said full-wave rectifier means, and means responsive to the engine timing for periodically triggering the first and further switching means thereupon to discharge said storage capacitor and produce an ignition impulse in said output load.

13. Apparatus as claimed in claim 12 and in which one terminal of the alternator means is grounded.

* * * * *